(12) United States Patent
Gibart et al.

(10) Patent No.: US 6,349,235 B1
(45) Date of Patent: Feb. 19, 2002

(54) PROGRAMMABLE LOGIC CONTROLLER SYSTEM AND METHOD FOR MODULE NUMBER ASSIGNMENT

(75) Inventors: Anthony G. Gibart; Dennis G. Schneider, both of New Berlin, WI (US); Makoto Shichi, Kariya (JP)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/193,927

(22) Filed: Nov. 16, 1998

(51) Int. Cl.[7] .............................................. G05B 11/01
(52) U.S. Cl. ........................................... 700/11; 710/9
(58) Field of Search ............................. 700/2, 3, 8, 9, 700/11, 24, 25, 26; 710/24, 9, 8, 3, 6, 5, 10, 26, 46, 104

(56) References Cited

U.S. PATENT DOCUMENTS

| | | | | |
|---|---|---|---|---|
| 4,360,913 A | * | 11/1982 | Struger et al. | 370/536 |
| 5,765,198 A | * | 6/1998 | McCrocklin et al. | 711/165 |
| 5,802,389 A | * | 9/1998 | McNutt | 710/1 |
| 6,065,068 A | * | 5/2000 | Foote et al. | 710/13 |
| 6,098,117 A | * | 8/2000 | Foote et al. | 710/8 |

* cited by examiner

Primary Examiner—William Grant
Assistant Examiner—Chad Rapp
(74) Attorney, Agent, or Firm—William R. Walbrun (57) ABSTRACT

A programmable controller system is provided having an input/output (I/O) module number assignment routine. The system includes a master controller and a plurality of I/O modules operatively connected thereto. The I/O modules form at least two banks. An individual module number is assigned to each of the plurality of I/O modules based on a successive position of each I/O module relative to the master controller and based on the I/O modules of each bank being numbered in succession in a predetermined direction through each bank.

23 Claims, 6 Drawing Sheets

PROGRAMMABLE LOGIC CONTROLLER SYSTEM AND METHOD FOR MODULE NUMBER ASSIGNMENT

BACKGROUND OF THE INVENTION

1. Field of the Invention

The present invention relates generally to programmable controllers of the type used in industrial automation. More particularly, the invention pertains to a system and method for module assignment of individual input/output (I/O) modules connected across a backplane.

2. Description of the Prior Art

A programmable controller is a type of general purpose industrial computer which controls the operation of industrial or factory automation equipment or processes, such as an assembly line or a machine tool, in accordance with a stored program. The stored program includes a series of instructions or commands that direct the programmable controller to execute actions.

One conventional type of programmable controller includes a rack that contains functional modules. A rack backplane provides signal buses and connectors for electrically coupling the functional modules. One functional module is a control module that has a processor which sequentially executes the control program stored in memory of the control module. Other functional modules include I/O modules that are provided to interface various input and output devices to the processor. The I/O modules are placed or inserted into the rack. The location of the I/O module in the rack typically defines the address to reference each connected device. Other known programmable controller systems allow the user to select or set the addresses for each module by setting internal switches.

Therefore, it is desirable to improve the module number selection to be well suited for rackless programmable controller systems, as well as provide ease of interchangeability of I/O modules and operator identification where the I/O modules are not preset by user selected switches or dictated by rack locations. As will be described in greater detail hereinafter, the system and method of the present invention accomplishes these tasks and employs a number of novel features that render it highly advantageous over the prior art.

SUMMARY OF THE INVENTION

Accordingly, it is an object of this invention to provide an improved programmable controller system.

Another object of this invention is to provide a method and system for assigning module numbers to I/O modules of a programmable controller system.

Still another object of this invention is to provide a method and system that allows banks of I/O modules to be positioned by a user in a desired orientation with the module numbers of the respective I/O modules being automatically assigned module numbers in accordance with an operator-friendly module identification system.

To achieve the foregoing and other objectives, and in accordance with the purposes of the present invention, a programmable controller system is provided having an I/O module number assignment routine. The system includes a control module or master controller having a processor that executes the control program stored in memory of the control module. A plurality of I/O modules are operatively connected to the master controller across a backplane for communication therewith. The I/O modules form at least two banks of I/O modules. An individual module number or address is assigned to each of the plurality of I/O modules based on a successive position of each I/O module relative to the master controller and based on the I/O modules of each bank being numbered in succession in a predetermined direction through each bank.

In accordance with another aspect of the present invention, a method is provided for assigning address numbers to I/O modules of a programmable controller system having a master controller. The method includes the following steps: serially connecting a plurality of I/O modules to the master controller for communication therewith; assigning relative addresses to each of the I/O modules in successive order by checking the status of an I/O module's left and right input signals, setting the module address of the I/O module and setting a module direction bit of the I/O module based on the left and right input signals, and repeating the steps of checking and setting for each succeeding I/O module downstream from the master controller; and assigning module addresses to each of the I/O modules based initially on the relative addresses. Banks formed of immediately adjacent I/O modules have module addresses for each respective bank being assigned in succeeding order in a predetermined direction by iteratively determining the direction of I/O modules based on the module direction bit and reversing the successive order of module addresses for I/O modules within a bank having a successive order in a direction opposite from a predetermined direction.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

In the following description, numerous specific details are set forth in order to provide a thorough understanding of the present invention. It will be obvious, however, to one skilled in the art that the present invention may be practiced without these specific details. In other instances, well-known circuits, structure and techniques have not been shown in detail in order not to unnecessarily obscure the present invention.

Figure 1:
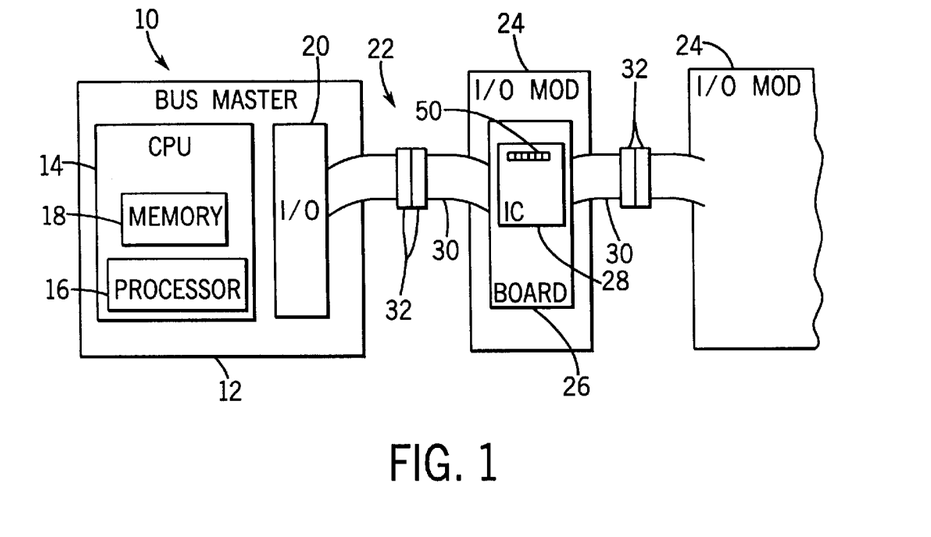
FIG. 1 is a block diagram of a programmable controller system of the present invention.

Referring now to the drawings, a programmable controller system 10 is illustrated in FIG. 1. The system 10 includes a master controller or bus master 12 that has a central processing unit 14 (CPU) of conventional type. The CPU 14 includes a processor 16 that is connected to memory 18. The memory 18 is configured to hold program and data files including the control program. The bus master 12 includes an input/output interface 20 operatively coupled to the CPU 14. The I/O interface 20 is connected with a backplane 22 that provides signal buses and connectors for electrically coupling a plurality of I/O modules 24.

In a preferred embodiment each I/O module 24 includes a circuit board 26 having an integrated circuit or ASIC 28 electrically connected thereon. A pair of cables 30 are electrically connected to the circuit board 26 for operative connection with the backplane 22 to allow communication across the backplane from the bus master 12 to each connected I/O module 24, as described later in more detail. Preferably, the ends of the cables 30 are provided with plugs 32 for mated connection with one another to provide a quick connection and disconnection of I/O modules to the backplane 22 and with one another. As used herein, the term I/O module refers to a module which interfaces to external devices. Some I/O modules may have solely input functions, solely output functions, or both input and output functions.

Figure 2:
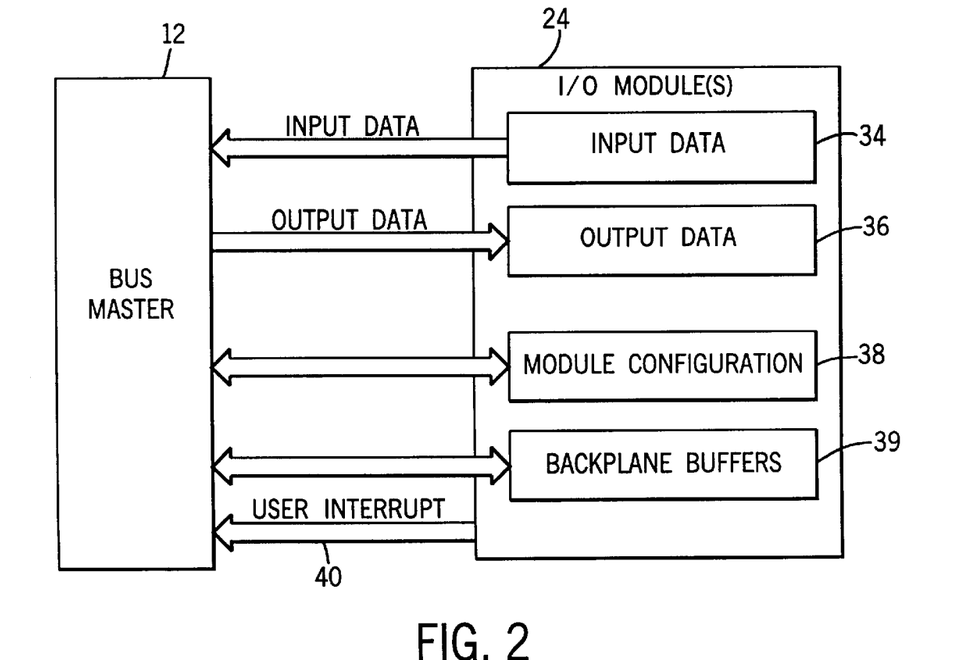
FIG. 2 is a block diagram of primary data exchange between the bus master and I/O module of the system of FIG. 1.

Referring to FIG. 2, the primary exchange of user data between the bus master 12 and the I/O modules 24 is through input and output data files or arrays 34, 36. In addition to the input and output data files 34, 36, user or module specific data can be communicated via module configuration 38, backplane buffers 39, or user interrupts 40, as illustrated in this preferred embodiment. As will be described later in more detail, the bus masters and modules also support certain system functions including module reset and module number assignment.

Figure 3:
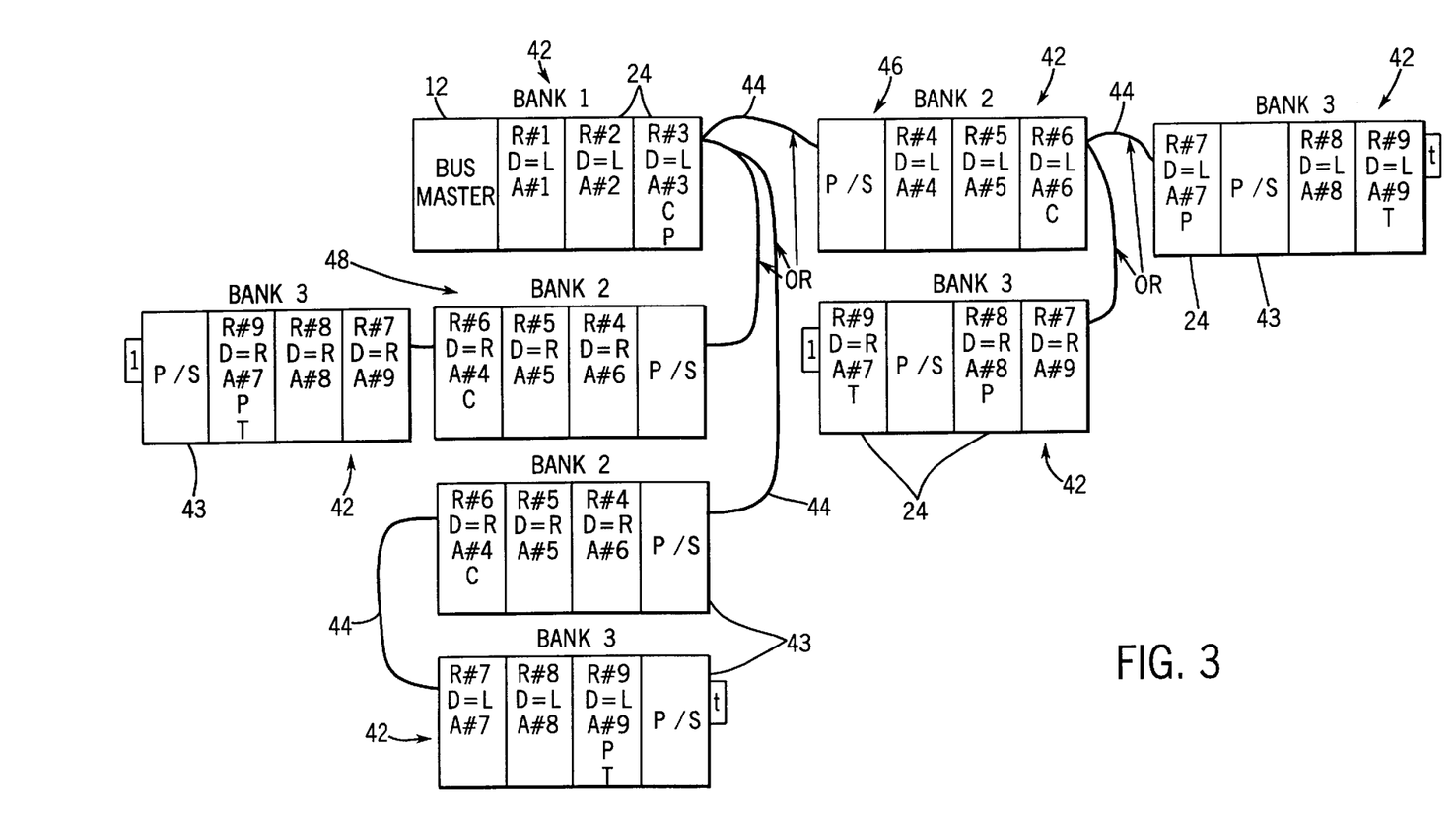
FIG. 3 is a block diagram illustrating possible connections of three banks of I/O modules in accordance with the teachings of the present invention.

Referring to FIG. 3, banks 42 are formed of immediately adjacent connected I/O modules 24. Additional power supplies 43 of conventional type and implementation are provided with each bank 42. The banks 42 are connected with cables 44 that are part of the backplane to interconnect the I/O modules. In a preferred embodiment, the backplane is a serial bus with the I/O modules being connected in a daisy chain configuration. FIG. 3 illustrates possible combinations of three banks of I/O modules 24. However, it should be understood that any other desired numbers of banks 42 and I/O modules 24 could be implemented as similarly shown.

It is significant to note that the I/O modules, as described herein, can be connected to the backplane in either a left-to-right or right-to-left direction. For example, bank 2 depicted in one configuration by numeral 46 receives information from the bus master 12 from the left and propagates information to the right. In comparison, bank 2 depicted in another configuration by numeral 48 receives information from the bus master 12 from the right and propagates information to the left. The ability to connect cables to either end of a bank 42 allows the user to configure a system using less cabling which is particularly desirous.

As previously described, rack systems provide I/O module number or addresses that are based on the rack bay location or on switches set on each I/O module. The present invention does not require racks or hardware switches and allows the system to automatically set module numbers based on those modules actually connected to the system, which provides for ease of use. As used herein, the terms module number and module address will be used interchangeably.

Additionally, the present invention provides for the use of a predetermined module identification system that is not solely based on the I/O modules' 24 relative position on the backplane. Rather, module number assignment is also based on a predetermined numbering protocol based on a left-to-right or right-to-left succession through each bank. In a preferred embodiment shown in FIG. 3, numbering through each bank 42 is provided in a left-to-right fashion regardless of which receiving end the bank is connected inline to the bus master 12. Accordingly, the operator may position the banks in a desired orientation with the module numbering from left-to-right providing an operator friendly system for quickly and more accurately identifying the module number of a particular I/O module connected in the system.

Figure 4:
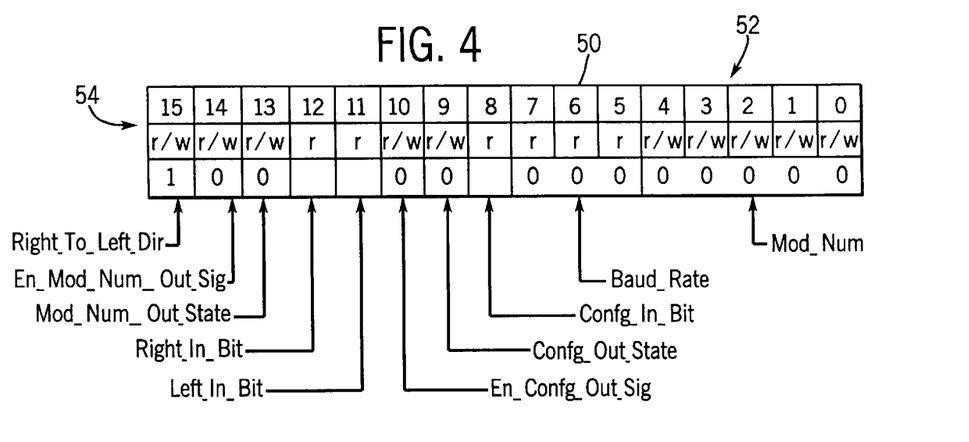
FIG. 4 is a diagram illustrating a module assignment array.
Figure 5:
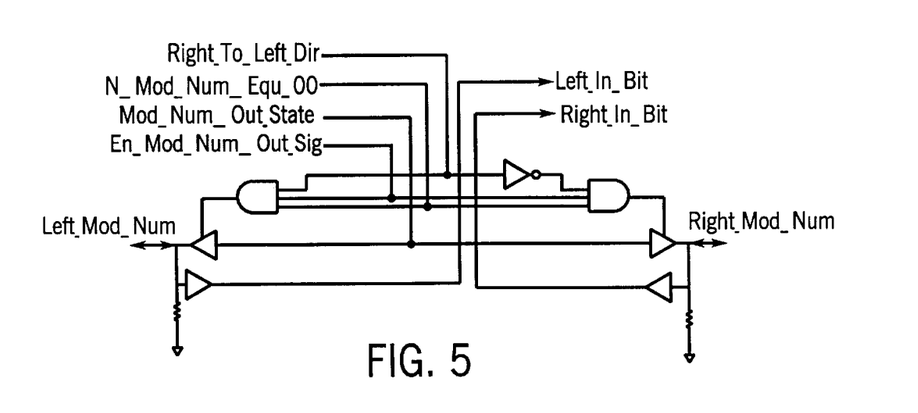
FIG. 5 is a schematic diagram illustrating the logic of Left_Mod_Num and Right_Mod_Num pins.

Referring to FIG. 4, a programmable module address array 50, Mod_Num_Assignment, is provided and held within the ASIC 50 (FIG. 1) of each I/O module 24 in the preferred embodiment illustrated. The module address array 50 includes first and second module numbers or addresses relating to the module number 52 and signal direction indicator 54, respectively. It should be understood that other memory configurations could be employed for retaining the module number 52 and signal direction indicator 54. With respect to the module number 52, a five bit address is used in the exemplary embodiment. These bits are readable and writeable and can be reset to 0 by a backplane reset signal or reset command.

Bits 5–7 indicate the baud rate that the module is configured to. The bit Confg_In_Bit represents the state of the Sys_Cnfg pin of the I/O module. This bit is used during system configuration to determine the location of cables and bus terminators. The Confg_Out_State bit controls the output state of I/O modules Sys_Cnfg pin. The En_Confg_Out bit controls the enabling and disabling of the I/O modules Sys_Cnfg pin. The reset value of this bit is 0. The Left_In_Bit represents the state of the Left_MOD_NUM pin of the I/O module. This bit is used during module number assignment to determine which direction the bus is running within this module's bank. The Right_In_Bit represents the state of the Right MOD_NUM pin of the I/O module. This bit is used during module number assignment to determine which direction the bus is running within this module's bank.

The Mod_Num_Out_State bit controls the output state of the Left_MOD_NUM or the Right_MOD_NUM pin. If this Bit=0 and a module number is assigned, and the En_Mod_Num_Out_Sig bit is set to a 1, either the Left_MOD_NUM or the Right_MOD_NUM output pin will be set to a 0, dependent upon the state of the Right_to_Left_Dir Bit. If the Right_to_Left_Dir bit=1, the Left_MOD_NUM pin will be set to a 0. If the Right_to_Left_Dir bit=0, the Right_MOD_NUM pin will be set to a 0. If this Bit=1 and a module number is assigned, and the En_Mod_Num_Out_Sig bit is set to a 1, either the Left_MOD_NUM or the Right_MOD_NUM output pin will be set to a 1, dependent upon the state of the Right_to_Left_Dir Bit. If the Right_to_Left_Dir bit=1, the Left_MOD_NUM pin will be set to a 1. If the Right_to_Left_Dir bit=0, the Right_MOD_NUM pin will be set to a 1.

The En_Mod_Num_Out_Sig bit controls the enabling of the Left_MOD_NUM or the Right_MOD_NUM output pins. If this Bit=0 the Left_MOD_NUM and the Right_MOD_NUM pins will be tri-stated. If this Bit=1 and a module number is assigned, either the Left_MOD_NUM or the Right_MOD_NUM pin will be driven as an output, dependent upon the state of the Right_to_Left_Dir bit. If the Right_to_Left_Dir bit=1, the Left_MOD_NUM pin will be driven as an output. If the Right_to_Left_Dir bit=0, the Right_MOD_NUM pin will be driven as an output. When enabled, the state of the output will be equal to the Mod_Num_Out_State bit.

The Right_to_Left_Dir bit controls the direction of the Left_MOD_NUM and Right_MOD_NUM output pins. The direction is set to correspond with the direction that the bus is flowing within the bank. The predetermined direction of a preferred embodiment is left-to-right. Referring to FIG. 4, the logic used in controlling the Left_MOD_NUM and Right_MOD_NUM pins is depicted. The Left_MOD_NUM and Right_MOD_NUM pins will be tri-stated until a Module Number is assigned and the En_Mod_Num_Out_Sig bit is set to a 1. After the Module Number is assigned and the En_Mod_Num_Out_Sig bit is set to a 1, the Mod_Num signal will take the direction assigned to the Right_to_Left bit. The output pin will be driven to the state of the Mod_Num_Out_State signal. While the foregoing provides a preferred embodiment of the memory array and pin logic, it should be understood that other configurations to carry out the necessary base functionality of retaining the module number and setting a bit representing the direction flow through the I/O module could equally be employed.

Figure 6:
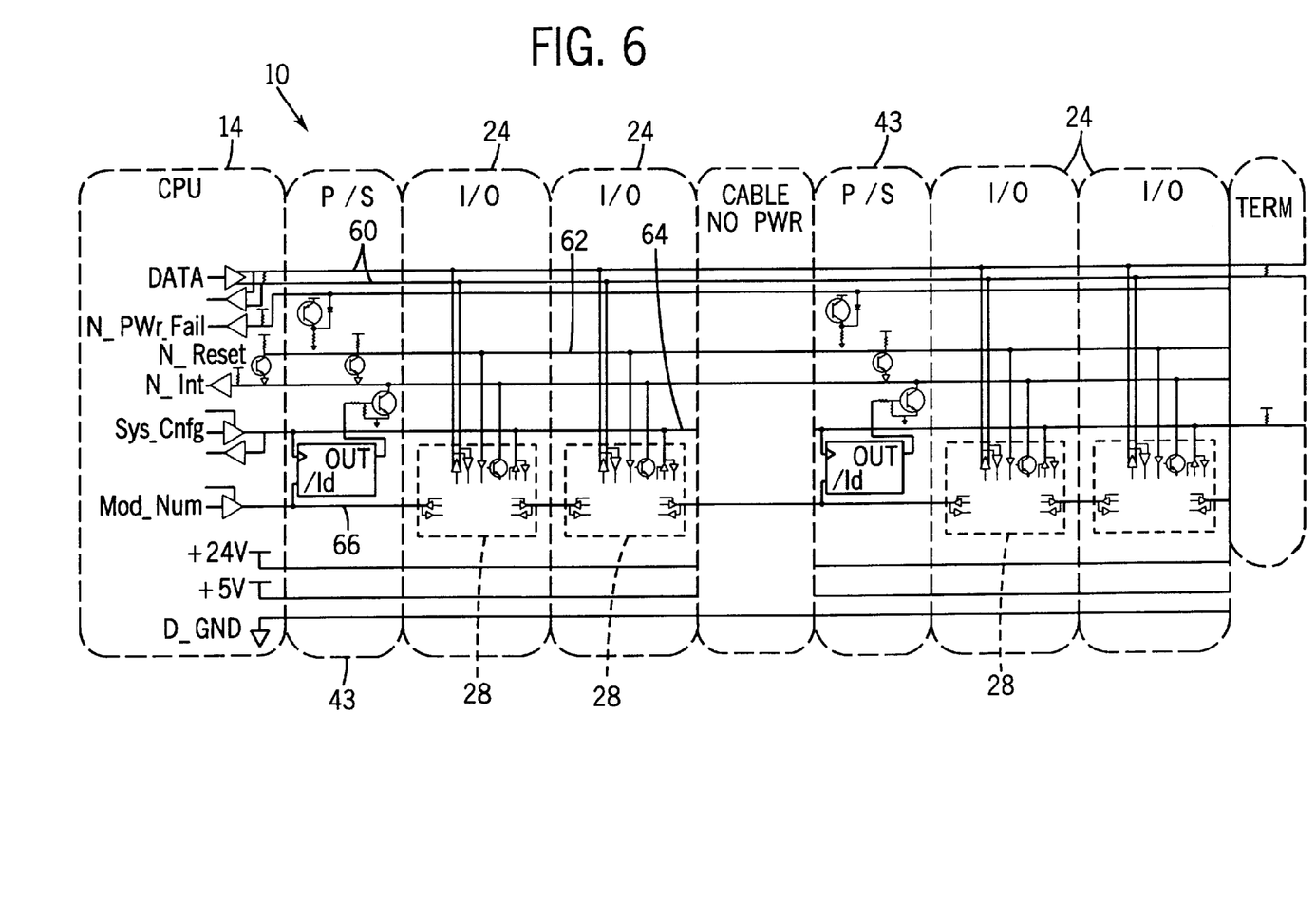
FIG. 6 is a block diagram of a representative system configuration.

Referring to FIG. 6, a block diagram of an exemplary system 10 is illustrated. The bus signals of the backplane include data lines 60, 61 for passing data signals between the bus master and the I/O module. The N_Reset signal on line 62 is used to put the I/O modules in a known state during power-up and power-down. The Sys-Confg line 64 is used to pass a Sys_Cnfg signal to allow the bus master to determine the location and type of cables and power supplies as well as determine the I/O modules within a bank, as later described. The Sys_Cnfg line and signal is not connected outside of its local bank of I/O modules, as illustrated in the drawings.

The MOD_NUM signal on line 66 allows the bus master to shift a signal down the bus that can be used to assign a module number to each modules. The Mod_Num signal is also used to determine the location and type of buffered cables and power supplies. The MOD_NUM signal flows through all bus banks of I/O. The MOD_NUM signal is a daisy-chained point to point connection from module to module. The MOD_NUM pin on the right side of a module is the Right_MOD_NUM pin. The MOD_NUM pin on the left side of a module is the Left_MOD_NUM_pin.

Referring back to FIG. 3, an I/O module can be viewed as having two module numbers. One number is the modules position down the I/O bus relative to the bus master (R#). The second module number is the module's assigned number (A#) which will always be left to right within any bank of I/O in accordance with this predetermined direction. The user will always see the A#. The system 10 will use the R# for module configuration purposes. The modules will be then assigned its A# prior to completion of module configuration. This initialization process is described in further detail below.

Figure 7:
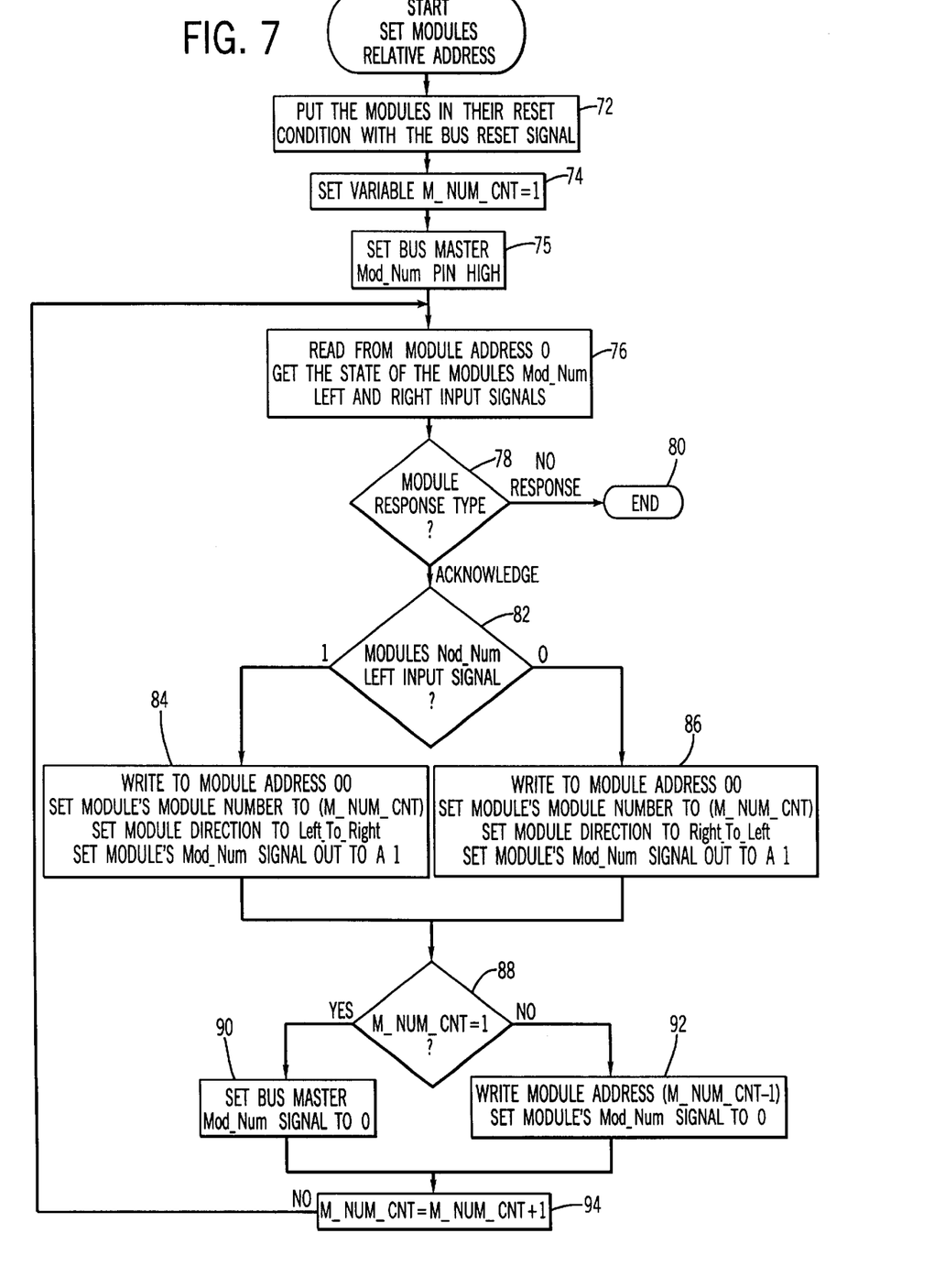
FIG. 7 is a flowchart of setting the relative addresses of an I/O module.

Referring now to FIG. 7, a flowchart of the process for assigning the module relative addresses is depicted. At step 72, the I/O modules are set in their reset condition with the bus reset signal. A counter M_NUM_CNT is set equal to 1 at step 74 for the first module. At step 75, the bus master's Mod_Num pin is set high. At step 76, a read from module address 0 is made and the state of the modules Mod_Num left and right input signals. If only one of the input signal is high and the address request is 0, then it is reading the next module to be assigned. If no response is received from a module at step 78, then there are no more modules to be assigned and the process ends at step 80. If acknowledged, the modules Mod_Num left input signal is read at step 82. If set at 1, then a write to module address 0 is made to set the module's module number to M_NUM_CNT at step 84. The Module direction is set to Left_to_Right and the module's Mod_Num signal out is set to 1 for the next loop for setting the next successive module. At step 86, if the read at step 82 set at 0, then a write to module address 0 is made to set the module's module number to M_NUM_CNT. The Module direction is set to Right_to_Left and the module's Mod_Num signal out is set to 1 for the next loop for setting the next successive module. At step 88, the M_NUM_CNT is checked to see if it is set at 1. If so, then the bus master's Mod_Num signal must be set to 0 at step 90. Otherwise, at step 92, a write occurs to the module address at position (M_NUM_CNT−1) to set that module's Mod_Num signal to 0. The M_NUM_CNT counter is incremented at step 88 and the process loops back to step 76 until the series of I/O modules have been provided with relative numbers and the process ends at step 80. Having been assigned relative numbers, the I/O modules are provided with user or module addresses as described below.

Figure 8:
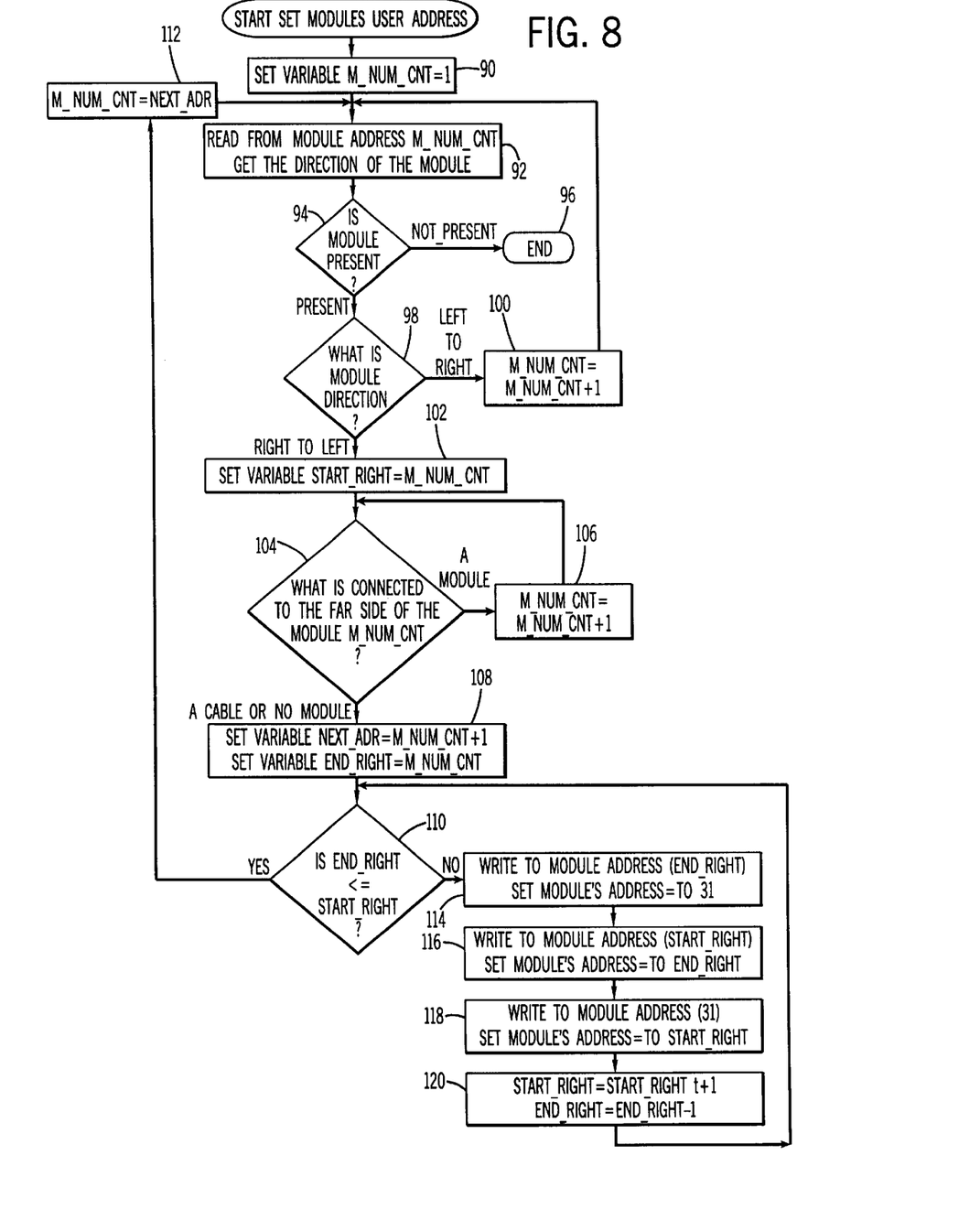
FIG. 8 is a flowchart of setting the module or user addresses of an I/O module.

Referring to FIG. 8, the flowchart for assigning user or module addresses is provided. At step 90, a counter variable M_NUM_CNT is set to 1. A read is made of module address M_NUM_CNT to receive the direction of that module at step 92. If the module does not respond at step 94, then the process is completed and ends at step 96. At step 98, the module direction bit is checked. As used herein, the direction bit could be single bit or more than one bit depending on the particular configuration. Accordingly, setting the direction bit, as used herein, may involve setting a single bit or two bits, for example, one for right-to-left and one for left-to-right. If the direction is left-to-right, which is desired, then the process can continue to the next module. Accordingly, the counter is incremented at step 100. If the direction is right to left, a check is made at step 104 to see what is connected to the far side of the module M_NUM_CNT. This determination is made by setting the Sys_Cnfg signal high and checking the Sys_Cnfg at a (M_NUM_CNT+1) position. If the Sys_Cnfg is still high at the (M_NUM_CNT+1) position, then it is known that it is another module and the M_NUM_CNT is incremented at step 106 and then loops back to step 104. If the Sys_Cnfg at the (M_NUM_CNT+1) position is set low, then either a cable is connected leading to the next bank or the end of the backplane has been reached. At step 108, variable NEXT_ADR is set to M_NUM_CNT+1 and variable END_RIGHT is set to M_NUM_CNT. At step 110, if END_RIGHT is less than or equal to START_RIGHT, then M_NUM_CNT is set to NEXT_ADR at step 112 and the process loops back to step 92. If END_RIGHT is greater than START_RIGHT, the swap routine of steps 114–120 is implemented. In other words, where a bank is found to be numbered right to left, the module numbers of the I/O modules are reversed in order. In the exemplary embodiment, address 31 is used as buffer for swapping purposes.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A programmable controller system having I/O module number assignment, comprising:

a master controller having a processor;

a plurality of I/O modules operatively connected to the master controller for communication therewith, the I/O modules forming at least two banks of I/O modules; and means for assigning an individual module number to each of said plurality of I/O modules based on a successive position of each I/O module relative to the master controller and based on the I/O modules of each bank being numbered in succession in one of two predetermined directions through each bank.

2. The system of claim 1, wherein the I/O modules are interconnected to one another across a backplane in a daisy chain configuration.

3. The system of claim 1, wherein the banks are positionable relative to one another in a desired orientation.

4. The system of claim 2, wherein the I/O modules are numbered left-to-right through each bank.

5. The system of claim 1, wherein each I/O module has programmable memory means for storing said module number.

6. A programmable controller system having I/O module number assignment, comprising:

a master controller having a processor;

at least two banks, each bank having at least two input/output modules, each of the I/O modules being operatively connected to one another serially and operatively connected to the master controller for communication therewith; and means for assigning an individual module number to each of said I/O modules during an initialization process based on a successive position of each I/O module relative to the master controller and based on the I/O modules of each bank being numbered in succession in one of two possible directions through each bank.

7. The system of claim 6, wherein the I/O modules are interconnected to one another across a backplane in a daisy chain configuration.

8. The system of claim 7, wherein the direction is left-to-right through each bank of I/O modules.

9. The system of claim 7, wherein each I/O module has programmable memory means for storing said module number.

10. A method for assigning address numbers to I/O modules of a programmable controller system having a master controller, the method comprising:

serially connecting a plurality of I/O modules to the master controller for communication therewith;

assigning relative addresses to each of the I/O modules in successive order; and assigning module addresses to each of the I/O modules based initially on said relative addresses with banks formed of immediately adjacent I/O modules having module addresses for each respective bank being assigned in succeeding order in a predetermined direction that can differ from said relative addresses.

11. The method of claim 10, wherein the step of assigning relative addresses includes the steps of:

checking the status of an I/O module's left and right input signals;

setting the module address of the I/O module and setting a module direction bit of the I/O module based on said left and right input signals; and repeating said steps of checking and setting for each succeeding I/O module downstream from said master controller.

12. The method of claim 10, wherein the step of assigning module addresses includes the step of iteratively determining the direction of I/O modules based on the module direction bit and reversing the successive order of module addresses for I/O modules within a bank having a successive order in a direction opposite from a predetermined direction.

13. The method of claim 12, wherein said step of reversing the successive order includes iteratively swaping module addresses of I/O modules within a respective bank.

14. The method of claim 10, wherein each bank of I/O modules has a system configuration line electrically connecting in serial each I/O module to one another, the system configuration lines between banks being electrically disconnected, and wherein the step for determining I/O modules within a bank includes the steps of setting the system configuration line high and checking the system configuration input of each successive I/O module until the system configuration line is low.

15. The method of claim 10, wherein the plurality of I/O modules are connected to the master controller in a daisy chain configuration.

16. A method for assigning address numbers to I/O modules of a programmable controller system having a master controller, the method comprising the steps of:

serially connecting a plurality of I/O modules to the master controller for communication therewith;

assigning relative addresses to each of the I/O modules in successive order by checking the status of an I/O module's left and right input signals, setting the module address of the I/O module and setting a module direction bit of the I/O module based on said left and right input signals, and repeating said steps of checking and setting for each succeeding I/O module downstream from said master controller; and assigning module addresses to each of the I/O modules based initially on said relative addresses with banks formed of immediately adjacent I/O modules having module addresses for each respective bank being assigned in succeeding order in a predetermined direction by iteratively determining the direction of I/O modules based on the module direction bit and reversing the successive order of module addresses for I/O modules within a bank having a successive order in a direction opposite from a predetermined direction.

17. The method of claim 16, wherein each bank of I/O modules has a system configuration line electrically connecting in serial each I/O module to one another, the system configuration lines between banks being electrically disconnected, and wherein the step for determining I/O modules within a bank includes the steps of setting the system configuration line high and checking the system configuration input of each successive I/O module until the system configuration line is low.

18. The method of claim 17, wherein the plurality of I/O modules are connected to the master controller in a daisy chain configuration.

19. A programmable controller system having I/O module number assignment, comprising:

a master controller having a processor;

a plurality of I/O modules operatively connected to the master controller for communication therewith, the I/O modules forming at least two banks of I/O modules, each of the plurality of I/O modules being assigned an individual module number based on a successive position of each I/O module relative to the master controller and based on the I/O modules of each bank being numbered in succession in one of two possible directions through each bank.

20. The system of claim 19, wherein the I/O modules are interconnected to one another across a backplane in a daisy chain configuration.

21. The system of claim 19, wherein the banks are positionable relative to one another in a desired orientation.

22. The system of claim 19, wherein one of the two possible directions is left-to-right through each bank of I/O modules.

23. The system of claim 19, wherein each I/O module has a programmable memory to store said module number.

* * * * *